(12) United States Patent
King et al.

(10) Patent No.: US 6,493,599 B2
(45) Date of Patent: Dec. 10, 2002

(54) AUTOMATED SYSTEM AND METHOD FOR GENERATING DATA TO DRIVE A MANUFACTURING PROCESS

(75) Inventors: Robert King, Austin, TX (US); David Blake, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/044,768

(22) Filed: Mar. 19, 1998

(65) Prior Publication Data

US 2002/0013803 A1 Jan. 31, 2002

(51) Int. Cl.[7] .............................................. G06F 19/00
(52) U.S. Cl. ...................................... 700/100; 709/318
(58) Field of Search ................................. 709/315, 318, 709/200, 332; 705/7, 8, 9; 714/55; 700/99, 100, 95, 108, 109; 713/500–503, 600–601

(56) References Cited

U.S. PATENT DOCUMENTS

| | | | | |
|---|---|---|---|---|
| 4,566,111 A | * | 1/1986 | Tanagawa | 377/28 |
| 4,796,211 A | * | 1/1989 | Yokouchi et al. | 714/55 |
| 4,912,708 A | * | 3/1990 | Wendt | 714/55 |
| 4,956,807 A | * | 9/1990 | Hosaka et al. | 714/55 |
| 5,048,017 A | * | 9/1991 | Breneman | 714/55 |
| 5,291,394 A | * | 3/1994 | Chapman | 700/100 |
| 5,463,555 A | * | 10/1995 | Ward et al. | 364/468.02 |
| 5,594,865 A | * | 1/1997 | Saitoh | 714/55 |
| 5,636,124 A | * | 6/1997 | Rischar et al. | 700/100 |
| 5,659,779 A | * | 8/1997 | Laird et al. | 709/226 |
| 5,995,753 A | * | 11/1999 | Walker | 707/102 |
| 6,138,171 A | * | 10/2000 | Walker | 709/318 |

* cited by examiner

Primary Examiner—St. John Courtenay, III
Assistant Examiner—Van H. Nguyen
(74) Attorney, Agent, or Firm—Haynes and Boone, LLP (57) ABSTRACT

A system for generating data for driving a manufacturing process is described. A symbiotic relationship is established between two Windows NT® system services, including a single instance of a "Sequencer" service, which provides the command, control, and communication for all work in progress, and multiple instances of a "Quantum" service, which manages the execution of a unit of work on command from the Sequencer. All configuration information for the system is stored in a system registry as predefined structures. Registry key entries define the names of the installed Quantum services, as well as the configuration dynamic linked library ("DLL") image to be loaded by and the sequence number for each Quantum. The Sequencer manages the start up of the installed Quantum services and synchronizes with the created message queues. The Sequencer manages all work in progress and maintains the state of each unit of work. The Sequencer passes work from one Quantum services message queue to the next, based on the Quantum's registry key entry for sequence number. This sequencing is continued until all defined sequences, that is, all Quantum services, have been successfully executed in turn. One of the Quantum services provides commands to the Sequencer to create a work object associated with a machine to be assembled. If a single Quantum sequence process fails, the Sequencer will log the error and discard that work object, preventing any further processing on it.

18 Claims, 5 Drawing Sheets

AUTOMATED SYSTEM AND METHOD FOR GENERATING DATA TO DRIVE A MANUFACTURING PROCESS

TECHNICAL FIELD

One embodiment relates generally to manufacturing systems and, more particularly, to an automated system and method for generating data to drive a manufacturing process.

BACKGROUND

Most, if not all, manufacturers of computer systems produce more than one product line. In addition, many computer system manufactures offer "made-to-order" computers that include a combination of components, systems, and software selected by the purchaser. In any event, for each individual computer system, or machine, assembled by a manufacturer, there needs to be some representation throughout the factory of the particular configuration of the machine so that it can be assembled properly with the right components installed therein.

For example, in one manufacturing system, a unique barcode is assigned to each machine to be built. A bar file associated with the machine and identified by the bar code number is stored by an application and contains what is essentially a "parts list" specifying what is to be included in the machine. When a machine is selected, or "pulled," for assembly, a "traveler" comprising a human-readable printout of the pars list specified in the bar file is generated and broadcast to a line controller, which may be, for example, a Unix workstation. The line controller runs a script that calls various executables to generate various output files containing data for use by tools on the factory floor. In particular, once the output files are generated, they are made available to the factory tools on the line.

Examples of output files such as those described above include an SDR file, which is a resource allocation file comprising a text listing of what components are to be included in the machine, SJS and DJS files, which are jumper and option setting files and respectively indicate system jumper settings and device jumper settings for the machine, and a PNP file, which is a parts configuration file and contains a binary stream used to program devices such as a network card.

The foregoing system suffers from several deficiencies. In particular, a separate line controller must be maintained for each manufacturing line. For example, if a manufacturer has four separate lines, it must also maintain four separate line controllers, one for controlling each line. Moreover, the system is not sufficiently fault tolerant or flexible. Still further, the system does not allow for promotion to be easily performed without interrupting the manufacturing process, which is becoming more important as manufacturers move to full time (i.e., 24 hours/day, 7 days/week) production schedules.

Therefore, what is needed is a system for generating data for driving a computer manufacturing process that is flexible, fault tolerant, and easily upgradable.

SUMMARY

One embodiment, accordingly, is a system for generating data for driving a manufacturing process involving a symbiotic relationship between two Windows NT® system services: a single instance of a "Sequencer" service, which provides the command, control, and communication for all work in progress, and multiple instances of a "Quantum" service, which manages the execution of a unit of work on command from the Sequencer.

All configuration information for the system is stored in Windows NT® System Registry as predefined structures. This information controls the operation and functionality of the Sequencer and the many Quantums. Registry key entries under "Processing Steps" define the names of the installed Quantum services. The configuration dynamic linked library ("DLL") image to be loaded by and the sequence number for each Quantum are also defined by registry entries.

The Sequencer is the main service and provides the management of starting the installed Quantums services and synchronizing with the created message queues. The Sequencer manages all work in progress and maintains the state of each unit of work. The Sequencer passes work from one Quantum services message queue to the next, based on the Quantum's registry key entry for sequence number. The sequence numbers are ordered from 0 to n, with n being the last sequence to execute. This sequencing is continued until all defined sequences, that is, all Quantum services, have been successfully executed in turn.

One of the Quantum services, usually sequence 0, provides commands to the Sequencer to create a work object associated with a machine to be assembled. The Sequencer creates this work object with a unique identifier used throughout the system. If a single Quantum sequence process fails, the Sequencer will log the error and discard that work object, preventing any further processing on it.

The communication protocol between the Sequencer and each Quantum allows Sequencer to monitor the status of all Quantum services. If a Quantum service becomes unsynchronized or experiences a protection fault, the Sequencer will detect the fatal error. If the Quantum service is unable to resolve the error on its own, the Sequencer will stop the Quantum service, clean up any resources used by the failed service, and restart the service. No work object is lost during the recovery and processing will continue where it left off This capability will prevent most downtime caused by this processing. This restarting and synchronizing capability allows for the anytime promotion of data and executable files. By utilizing external communications ports, the Sequencer may be commanded to pause processing, thus allowing for services to be stopped and replaced or data files copied without the possibility of contention from other running processes. After the promotion completes, the Sequencer is commanded to resume and processing continues using the promoted files.

The Sequencer also provides facilities for communication with other applications in the manufacturing environment. The Sequencer listens on a known TCP/IP port and interprets messages adhering to a designated communications protocol. This facility is utilized in two steps. First, a request is made by an application via a Sequencer listening Port for notification of certain events. Then, when the Sequencer generates one of the requested events, a notification will be sent to the requesting application via a Sequencer Notify Port. This allows for automated notifications to service personnel of fatal errors before the failure is apparent on the factory floor. The notification facilities may also be used to monitor the health of a system and maintain a log of work processed.

The Quantum service provides an abstraction layer. The dynamic properties of Quantum allow for runtime definition of a user-specified DLL. This abstraction layer provides the versatility and scalability of the system. New functionality is provided by the uniqueness of the library loaded. Requirements for the library are simple. The library must provide two exported functions, Start( . . . ) and Stop( . . . ). The library must begin whatever processing it is designed to do on the Start command. The library must also immediately abort any processing on the Stop command. The library must communicate to the Quantum services, utilizing thread message queues, that the work requested has started processing, and that processing has completed successfully or has failed. This processing of the work initiated by the library must take place in a separate address space from the Quantum service containing the library image. This prevents any catastrophic process failure from adversely affecting the Quantum service or the operation of the Sequencer. The design of a library and its interface with an associated sequence process is limited only by the designer's imagination. The only constraints are the exported functions and the required notifications needed by Quantum.

A technical advantage achieved is that, by creating a variety of Quantum library DLLs and associated sequence processes, the system is capable of remaining "output compatible" with existing manufacturing processes and will easily scale into new manufacturing technologies as they are delivered.

Another technical advantage achieved is that the system is highly scalable and allows for quick and easy process customization for each of a number of manufacturing facilities and lines of business.

Yet another technical advantage achieved is that the system provides "anytime" promotion capabilities to allow upgrading of data and executable files during normal operation without impacting factory production.

Still another technical advantage achieved is that the system is extremely fault tolerant and makes significant technical advances in obtaining the objective of zero downtime.

Still another technical advantage achieved is that a single instance of the system supports the entire manufacturing facility for all lines of business, with a backup system for providing additional fault tolerance.

DESCRIPTION OF THE PREFERRED EMBODIMENT

Figure 1:
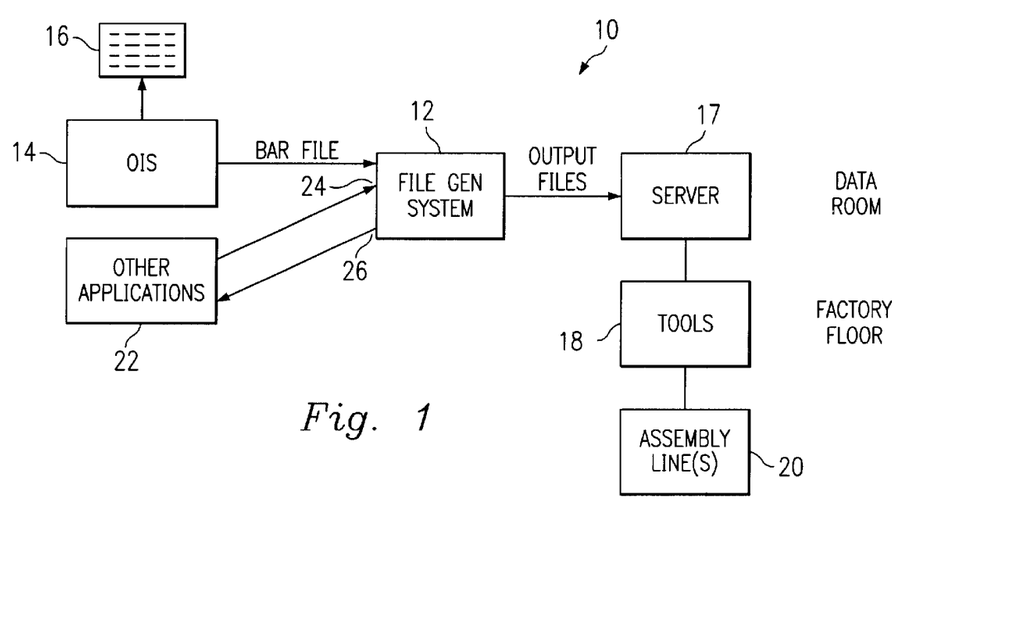
FIG. 1 is a block diagram of a manufacturing environment embodying features of a preferred embodiment.

FIG. 1 is a block diagram of a manufacturing environment 10 including a preferred embodiment of a file generation ("FileGen") system 12. In one embodiment, the manufacturing environment 10 relates to the production and assembly of personal computer systems, or "machines". In the manufacturing environment 10, a unique barcode is assigned to each machine to be built. A bar file (not shown) associated with the machine and identified by the bar code number is stored by an order information system ("OIS") and designated in FIG. 1 by a reference numeral 14. The bar file contains what is essentially a "parts list" specifying what is to be included in the machine. When a machine is selected, or "pulled," from the OIS 14 by an operator for assembly, a traveler 16 comprising a human-readable printout of the pars list specified in the bar file is generated.

Simultaneously, the bar file is broadcast to the FileGen system 12 to initiate the generation of the various output files (e.g., SDR, SJS, DJS, and PNP files) needed to drive the manufacturing process performed in the manufacturing environment 10, as will be described in detail below. Once the output files have been generated, they are published on a server 17 for access by factory tools, collectively designated by a reference numeral 18, in controlling certain aspects of an assembly line 20.

In another aspect, the FileGen system 12 also provides facilities for communication with other applications, collectively designated by a reference numeral 22, in the manufacturing environment. Specifically, the system 12 "listens" on a known TCP/IP port 24, hereinafter referred to as the "Sequencer Listening Port," and interprets messages adhering to a designated communications protocol. This facility is utilized in two steps. First, a request is made by an application 22 via the Sequencer Listening Port 24 for notification of certain events. Then, when one of the requested events is generated, a notification is sent to the requesting application 22 via another known TCP/IP port 26 designated the "Sequencer Notify Port." This allows for automated notifications to service personnel of fatal errors before the failure is apparent on the factory floor. The notification facilities may also be used to monitor the health of the system 12 and maintain a log of work processed.

The FileGen system 12 will now be described in greater detail with reference to FIG. 2A. The FileGen system 12 involves a symbiotic relationship between two Windows NT® system services: a single instance of a "Sequencer" service 200, which provides the command, control, and communication for all work in progress, and multiple instances of a "Quantum" service 202, which manage the execution of a unit of work on command from the Sequencer. As illustrated in FIG. 2, the Sequencer 200 executes in its own protected address space. Similarly, the multiple instances of the Quantum service 202 execute in a protected address space separate from that of the Sequencer 202. Additionally, sequence processes 204 called by the Quantum services 202 to perform a unit of work execute in a third protected address space. This feature, as well as the hierarchical structure of the FileGen system 12, are further illustrated in FIG. 2B.

All configuration information for the FileGen system 12 is stored in the Windows NT ® System Registry as predefined structures. This information controls the operation and functionality of the Sequencer and the many Quantums. Registry key entries under "Processing Steps" define the names of the installed Quantum services. The configuration dynamic linked library ("DLL") image for this Quantum to load and its sequence number are also stored. A relevant portion of the System Registry is set forth below:

| | |
|---|---|
| ...\Processing Steps | Registry Key |
|   Quantum Service Name | Registry Key |
|     Image:path and name of DLL | Key Value ascii |
|     Sequence Number:Sequence Position for this Quantum's execution | Key Value double |

The Sequencer 200 is the main service and provides the management of starting the installed Quantum services 202 and synchronizing with the created message queues. The Sequencer 200 manages all work in progress and maintains the state of each work object, as represented in FIG. 2A by a work in progress management module 209 and as will be further described in connection with FIG. 3. The Sequencer 200 passes work from one Quantum services messaging queue to the next, based on the Quantum's registry entry for sequence number. The state of each Quantum service 202 is maintained by the Quantum and monitored by the Sequencer 200. The sequence numbers are ordered from 0 to n−1, with n−1 being the last sequence to execute. This sequencing is continued until all defined sequences, each Quantum service, have been successfully executed in turn.

One of the Quantum services, usually sequence 0, provides commands to the Sequencer to create a work object corresponding to the received bar file and representing a machine to be assembled. The Sequencer creates this work object with a unique identifier used throughout the system 12. The work object is a data structure identified with a particular bar file, and thus, a particular machine to be built. The data stored in the work object is processed as will be described in greater detail below. As will also be described, if a single Quantum sequence process fails, the Sequencer 200 will log the error and discard the current work object, preventing any further processing on it.

The communication protocol between the Sequencer 200 and the instantiations of the Quantum 202 via respective Messaging Queues 210, 212, enables the Sequencer to monitor the status of all Quantum services. If a Quantum service 202 becomes unsynchronized or experiences a protection fault, the Sequencer 200 will detect the fatal error via an Error Detection and Recovery module 214. If the Quantum service 202 is unable to resolve the error on its own, the Sequencer 200 will stop the Quantum service, clean up any resources used by the failed service, and restart the service. No work object is lost during the recovery and processing will continue where it left off. This capability will prevent most downtime caused by this processing. This restarting and synchronizing capability allows for the anytime promotion of data and executable files. By utilizing the external communications ports, the Sequencer 200 may be commanded to pause processing, thus allowing for services to be stopped and replaced or data files copied without the possibility of contention from other running processes. After the promotion completes, the Sequencer 200 is commanded to resume and processing continues using the promoted files.

The Sequencer 200 also provides facilities for communication with other products in the manufacturing environment. The Sequencer 200 listens on the Sequencer Listening Port 24. This facility is utilized in two steps. First, an application's request is made on the Sequencer Listening Port 24 for notification of known events, such as an error in processing. When the Sequencer 200 generates one of the requested events, a notification will be sent to the requesting application 22 (FIG. 1). This allows for automated notifications to service personnel of fatal errors before the failure is apparent on the factory floor. The notification facilities may also be used to monitor the health of the system 12 and maintain a log of work processed.

Figures 2A, 3:
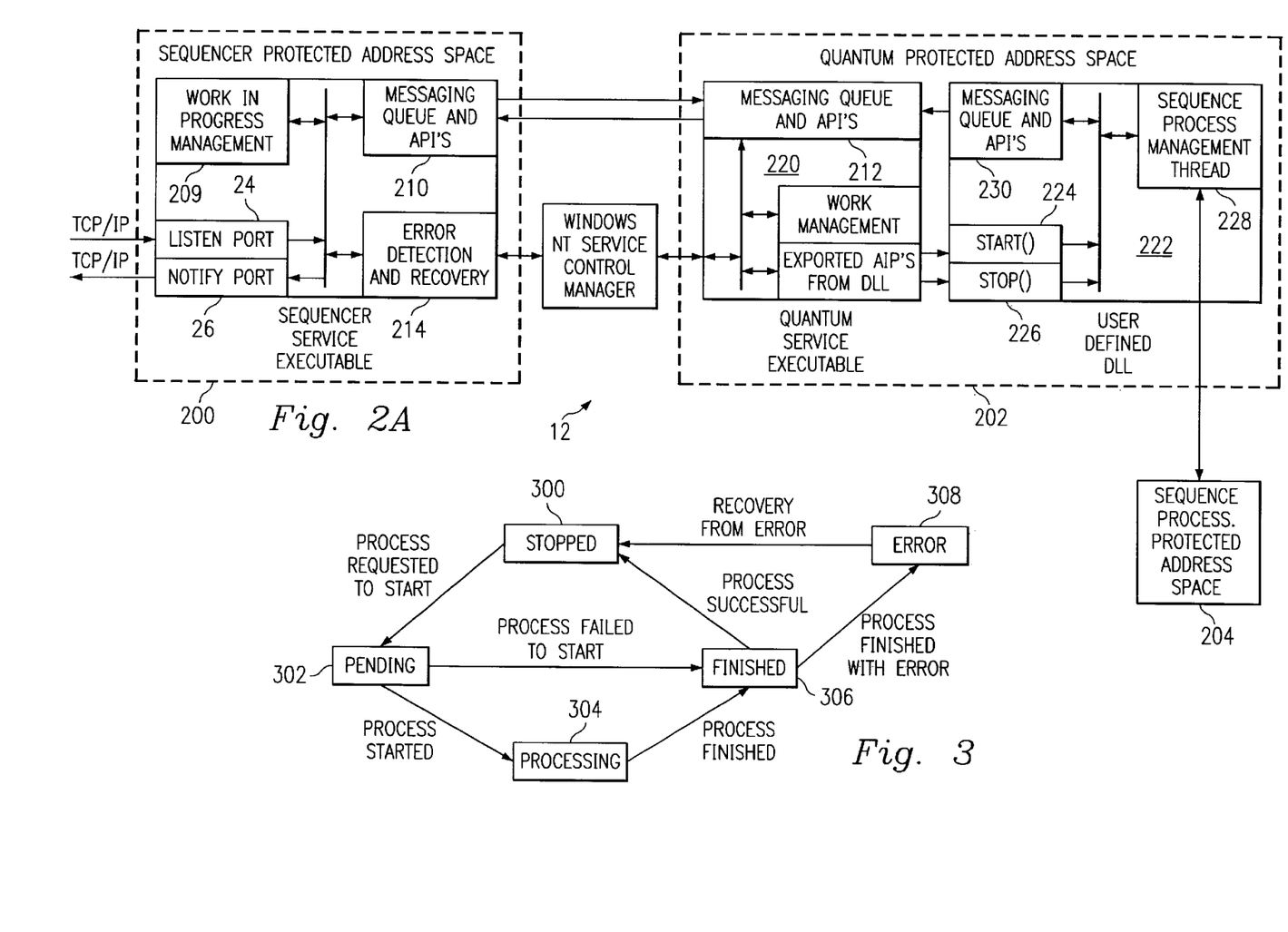
FIG. 2A is a block diagram of a file generation ("FileGen") system of the manufacturing environment of FIG. 1.
FIG. 3 is a state diagram of a work object managed by the FileGen system of FIG. 2A.
Figure 2B:
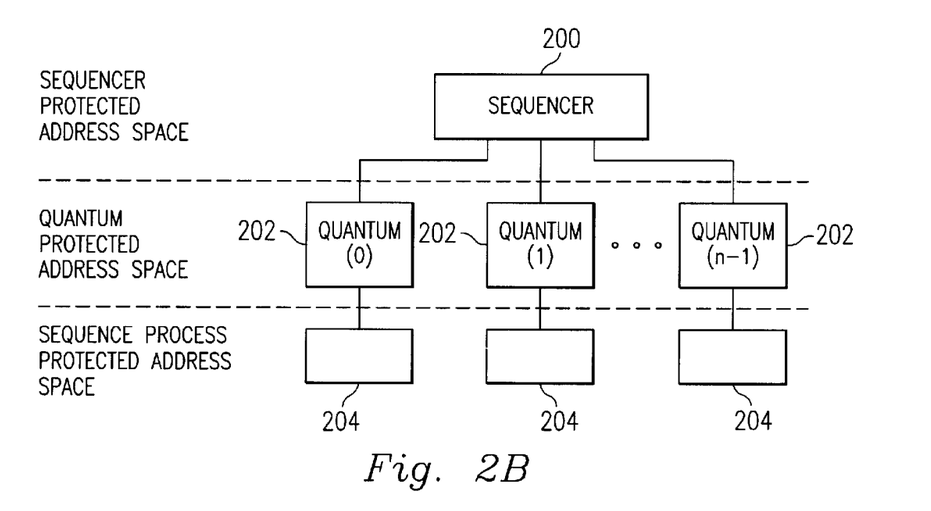
FIG. 2B is a hierarchical diagram of the FileGen system of FIG. 2A.

As illustrated in FIG. 2A, each Quantum service 202 provides an abstraction layer 220. The dynamic properties of the Quantum service 202 allow for runtime definition of a user-specified DLL 222. This abstraction layer 220 provides the versatility and scalability of the system. New functionality is provided by the uniqueness of the DLL 222 loaded. Requirements for the DLL 222 are simple. The DLL 222 must provide two exported functions, Start( . . . ) 224 and Stop( . . . ) 226. The DLL 222 must begin whatever processing it is designed to do on the Start command 224 and must also immediately abort any processing on the Stop command 226. The DLL 222 must communicate with the Quantum sequence processes 204 services, utilizing thread message queues 228, and to the abstraction layer 220 via a massaging queue 230 that the work requested has started processing, and succeeded or failed the processing. This processing of the work initiated by the DLL 222 must take place in a separate address space from the Quantum service containing the DLL image. This prevents any catastrophic process failure from adversely affecting the Quantum service or the operation of the Sequencer. The design of a DLL and its interface with an associated sequence process 204 is limited only by the designer's imagination. The only constraints are the exported functions and the required notifications needed by Quantum 202.

By creating a variety of Quantum library DLLs and associated sequence processes, the FileGen system 12 is able to remain "output compatible" with the existing manufacturing process. The system will also scale into new manufacturing technologies as they are delivered.

FIG. 3 illustrates a state diagram of a work object created by the FileGen system 12 for use as will be described in greater detail below. Initially, the work object is in a Stopped state 300. When it receives a request to start processing, the work object cycles from the Stopped state 300 to a Pending state 302. At this point, a watchdog timer is started and the Quantum service 202 will gather data, queue it up, call the Start ( . . . ) function, which will start the thread and launch the process. At this point, the Quantum service 202 indicates to the Sequencer 200 that the process has started, causing the work object to cycle to a Processing state 304. If the process fails to start, the work object cycles from the Pending state 302 to a Finished state 306 and then directly to an Error state 308.

If the processing is completed with no errors, the work object cycles from the Processing state 304 to the Finished state 306, in which internal housekeeping is performed, and then returns directly to the Stopped state 300. At this point, the work object is ready to be queued up again.

Figure 4:
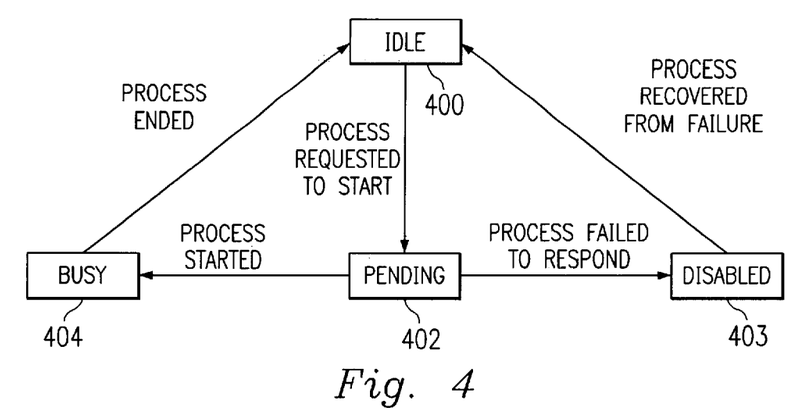
FIG. 4 is a state diagram of a Quantum service of the FileGen system of FIG. 2A.

FIG. 4 illustrates a state diagram of the Quantum service 202. Initially, the Quantum 202 is in an Idle state 400. Receipt from the Sequencer 200 by the Quantum 202 of a request to start processing causes the Quantum to cycle to a Pending state 402. While in the Pending state 402, the Quantum awaits notice from the sequence process that processing has been started. If this notification is not received, the Quantum cycles to a Disabled state 403, at which point the process recovers from the failure and the Quantum returns to the Idle state 400. This also causes the work object to cycle to the Error state 308. When the requested processing begins, the Quantum cycles to a Busy state 404 and remains in the Busy state 404 until processing is completed, at which point, the Quantum returns to the Idle state 400.

It will be recognized that the state of a Quantum indicates whether it can currently be assigned to perform processing on a work object. In particular, if a Quantum's state is Idle 400, the Quantum can be used; otherwise, it is currently processing another work object and cannot be used.

Figure 5:
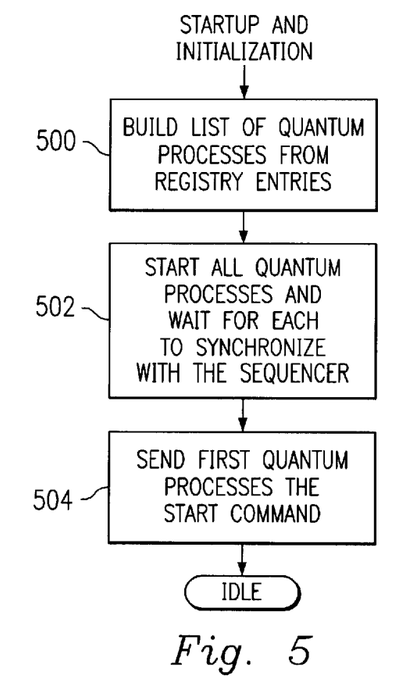
FIG. 5 is a flowchart of a startup and initialization sequence of the FileGen system of FIG. 2A.

Referring now to FIGS. 5–12, the operation of the Sequencer 200 and Quantum services 202 will now be described in greater detail. In FIG. 5, at startup and initialization of the system 12, in step 500, the Sequencer 200 builds a sequential list of Quantum processes from the registry entries. In step 502, the Sequencer 200 starts all listed Quantum processes and waits for each to register and synchronize with the Sequencer. In step 504, a Start command is sent to the first Quantum process (sequence 0).

Figure 6:
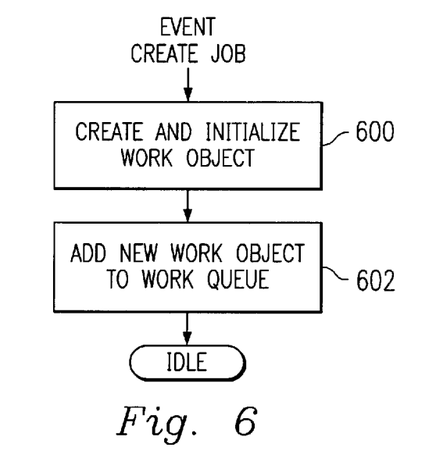
FIG. 6 is a flowchart of a create job sequence of the FileGen system of FIG. 2A.

Eventually, a "Create Job" event will occur in response to a bar file being broadcast to the system 12. As shown in FIG. 6, in response to a Create Job event, in step 600, the first Quantum process (sequence 0) performs a sanity check on the bar file and sends a message to the Sequencer 200 to create an initialize a work object. Next, in step 602, the new work object is added to a work queue maintained in the module 209.

Figure 7:
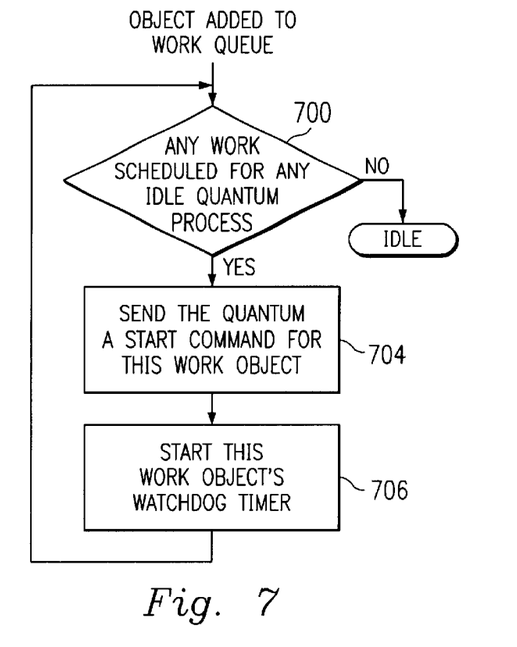
FIG. 7 is a flowchart of an object added to work queue sequence of the FileGen system of FIG. 2A.

FIG. 7 illustrates the scheduling function performed by the Sequencer 200. As shown in FIG. 7, each time a work object is added to the work queue, in step 700, a determination is made whether any work is scheduled for that work object for any idle Quantum processes. If not, the Sequencer returns to an idle state in step 702. Otherwise, in step 704, the idle Quantum is sent a Start command for processing on the work object. In step 706, the work object's watchdog timer is set and execution returns to step 700. The watchdog timer ensures that when the work object is pulled out of the work queue and sent for processing by a Quantum service, that, if an error occurs and processing is not performed, the work object is recovered.

Figure 8:
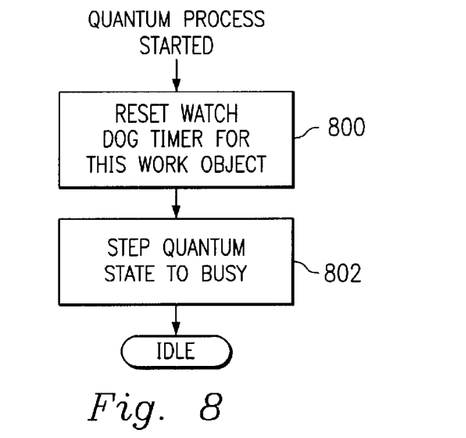
FIG. 8 is a flowchart of a Quantum process started sequence of the FileGen system of FIG. 2A.

As shown in FIG. 8, when a Quantum process is started, in step 800, the work object's watchdog timer is reset. Then, in step 802 the Quantum's state is set to Busy.

Figure 9:
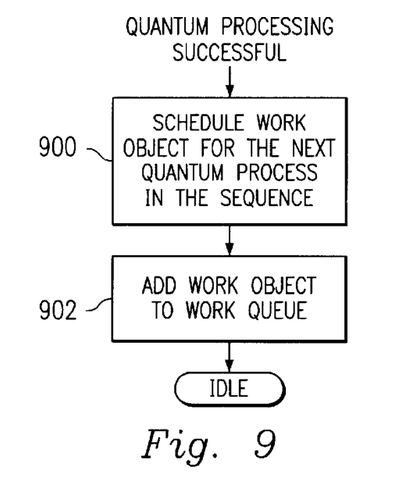
FIG. 9 is a flowchart of a Quantum processing successful sequence of the FileGen system of FIG. 2A.

As shown in FIG. 9, when Quantum processing on a particular work object proves successful, in step 900, the work object is scheduled for the next Quantum process in the sequence. For example, if the work object was just processed by the Quantum process having a sequence number of 1, the work object is scheduled for the Quantum process having a sequence number of 2. Then, in step 902, the work object is added back to the work queue. It will be recognized that the performance of step 902 results in the initiation of the sequence shown in FIG. 7 and described in detail above. In this manner, each Quantum is freed up to start processing on another work object.

Figure 10:
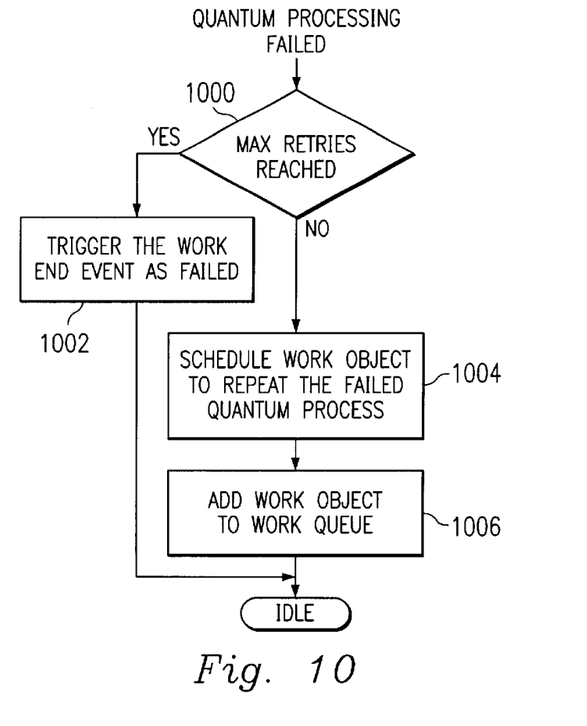
FIG. 10 is a flowchart of a Quantum processing failed sequence of the FileGen system of FIG. 2A.

As shown in FIG. 10, if the Quantum processing fails, in step 1000, a determination is made whether the maximum number of retries has been reached. If so, in step 1002, the work end event is triggered as "Failed." Otherwise, in step 1004, the work object is scheduled to repeat the failed Quantum process and, in step 1006, the work object is added back to the work queue.

Figure 11:
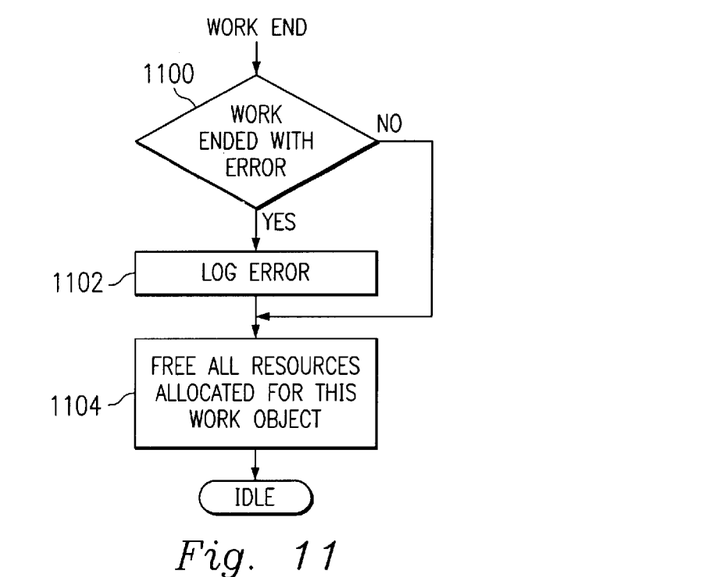
FIG. 11 is a flowchart of a work end sequence of the FileGen system of FIG. 2A.

As shown in FIG. 11, responsive to a work end event, in step 1100, a determination is made whether the work ended with an error. If so, in step 1102, the error is logged. If the work did not end with an error or after an error is logged, in step 1104, all resources allocated for the work object are freed up and processing for this work object ceases.

Figure 12:
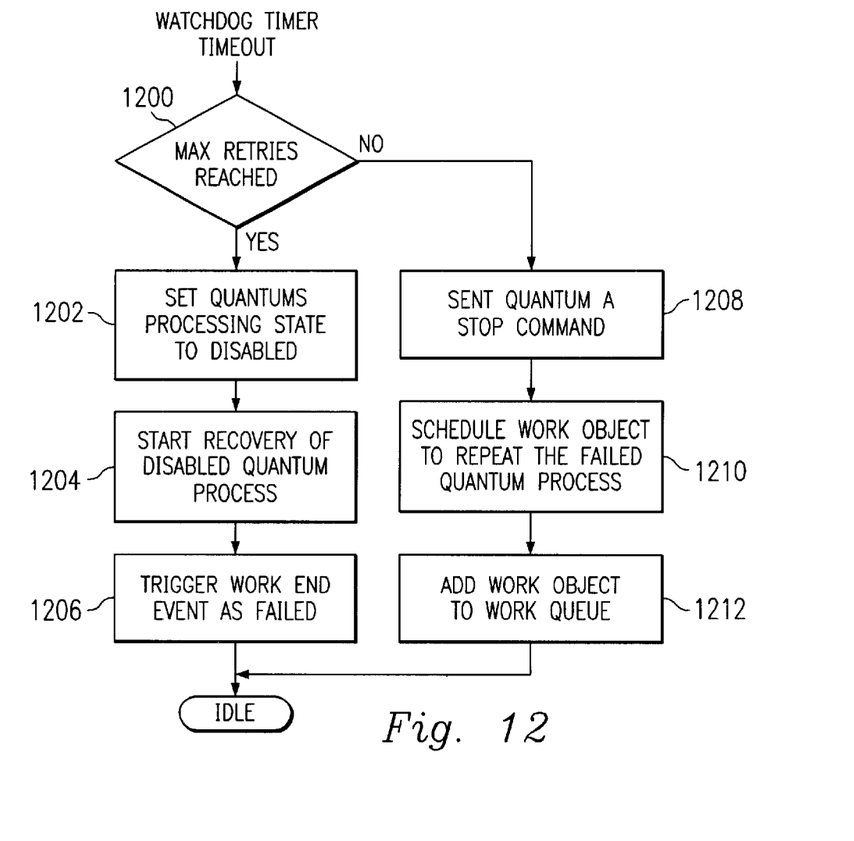
FIG. 12 is a flowchart of a watchdog timer timeout sequence of the FileGen system of FIG. 2A.

FIG. 12 illustrates the Watchdog timer timeout sequence. In step 1200, responsive to a watchdog timer timeout, a determination is made wether the maximum number of retries has been reached. If so, in step 1202, the state of the Quantum is set to Disabled and in step 1204, recovery of the disabled Quantum process is started. Finally, in step 1206, the work end event is triggered as "Failed". If in step 1200 it is determined that the maximum number of retries has not been reached, execution proceeds to step 1208, in which the Quantum is sent a Stop command. Then in step 1210, the work object is scheduled to repeat the failed Quantum process and in step 1212, the work object is added back to the work queue.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method of generating data for driving a manufacturing process in a manufacturing environment comprising at least one tool, the method comprising:

responsive to receipt of a bar file that includes a parts list identifying components of a computer system to be built in the manufacturing environment, creating a work object corresponding to said bar file and said computer system;

generating an output file that includes information for programming one or more of the components of the computer system;

adding said work object to a work queue;

removing said work object from said work queue and initiating an instance of a service object to perform a unit of work on said work object;

responsive to completion of said performance of said unit of work, advising a control object of said completion;

continuing said removing and initiating and said advising until processing is completed on said work object;

contemporaneously with said removing and initiating, setting a watchdog timer for said work object; and the watchdog timer ensuring that when the work object is removed from the work queue and sent for processing by the service object, if an error occurs and processing is not completed, the work object is recovered.

2. The method of claim 1 further comprising, responsive to receipt of said error message by said control object:

determining whether a maximum number of retries for said unit of work for said work object has been reached; and if said maximum number of retries has not been reached, returning said work object to said work queue; and if said maximum number of retries has been reached, triggering a work end event for said object as failed.

3. The method of claim 1 further comprising, responsive to an indication that performance of said unit of work has failed:

determining whether a maximum number of retries for said unit of work for said work object has been reached; and if said maximum number of retries has not been reached, returning said work object to said work queue; and if said maximum number of retries has been reached, triggering a work end event for said object as failed.

4. The method of claim 1 wherein said initiating comprises loading a dynamic linked library ("DLL") image particular to said instance of said service object.

5. The method of claim 1 further comprising:
receiving a request from an application via a first communications port requesting notification of a designated event; and
responsive to detection of said designated event, providing notification to said application via a second communications port.

6. The method of claim 1 further comprising, upon successful completion of processing of said work object, publishing said data to a network server for access by said tools.

7. A computer program for generating data for driving a manufacturing process in a manufacturing environment comprising at least one tool, the computer program being stored on computer-readable media and comprising:
instructions for creating a work object corresponding to a bar file that includes a parts list identifying components of a computer system to be built in the manufacturing environment and corresponding to the computer system responsive to receipt of said bar file;
instructions for generating an output file that includes information for programming one or more of the components of the computer system;
instructions for adding said work object to a work queue;
instructions for removing said work object from said work queue and initiating an instance of a service object to perform a unit of work on said work object;
instructions for advising a control object of said completion responsive to completion of said performance of said unit of work;
instructions for continuing said removing and initiating and said advising until processing is completed on said work object; and instructions for setting a watchdog timer for said work object upon said removing and initiating, the watchdog timer ensuring that when the work object is removed from the work queue and sent for processing by the service object, if an error occurs and processing is not completed, the work object is recovered.

8. The computer program of claim 7 further comprising instructions for, responsive to receipt of said error message by said control object, determining whether a maximum number of retries for said unit of work for said work object has been reached, and, if said maximum number of retries has not been reached, returning said work object to said work queue, and, if said maximum number of retries has been reached, triggering a work end event for said object as failed.

9. The computer program of claim 7 further comprising instructions for, responsive to an indication that performance of said unit of work has failed, determining whether a maximum number of retries for said unit of work for said work object has been reached, and, if said maximum number of retries has not been reached, returning said work object to said work queue, and, if said maximum number of retries has been reached, triggering a work end event for said object as failed.

10. The computer program of claim 7 wherein said instructions for initiating comprise instructions for loading a dynamic linked library ("DLL") image particular to said instance of said service object.

11. The computer program of claim 7 further comprising:
instructions for receiving a request from an application via a first communications port requesting notification of a designated event; and
instructions for providing notification to said application via a second communications port responsive to detection of said designated event.

12. The computer program of claim 7 further comprising instructions for publishing said data to a network server for access by said tools upon successful completion of processing of said work object.

13. A system for generating data for driving a manufacturing process in a manufacturing environment comprising at least one tool, the system comprising:
means for creating a work object corresponding to said bar file that includes a parts list identifying components of a computere system to be built in the manufacturing environment and corresponding to the computer system responsive to receipt of said bar file;
means for generating an output file that includes information for programming one or more of the components of the computer system;
means for adding said work object to a work queue;
means for removing said work object from said work queue and initiating an instance of a service object to perform a unit of work on said work object;
means for advising a control object of said completion responsive to completion of said performance of said unit of work;
means for continuing said removing and initiating and said advising until processing is completed on said work object; and
means for setting a watchdog timer for said work object upon said removing and initiating, the watchdog timer ensuring that when the work object is removed from the work queue and sent for processing by the service object, if an error occurs and processing is not completed, the work object is recovered.

14. The system of claim 13 further comprising means for, responsive to receipt of said error message by said control object, determining whether a maximum number of retries for said unit of work for said work object has been reached, and, if said maximum number of retries has not been reached, returning said work object to said work queue, and, if said maximum number of retries has been reached, triggering a work end event for said object as failed.

15. The system of claim 13 further comprising means for, responsive to an indication that performance of said unit of work has failed, determining whether a maximum number of retries for said unit of work for said work object has been reached, and, if said maximum number of retries has not been reached, returning said work object to said work queue, and, if said maximum number of retries has been reached, triggering a work end event for said object as failed.

16. The system of claim 13 wherein said means for initiating comprise means for loading a dynamic linked library ("DLL") image particular to said instance of said service object.

17. The system of claim 13 further comprising:
means for receiving a request from an application via a first communications port requesting notification of a designated event; and
means for providing notification to said application via a second communications port responsive to detection of said designated event.

18. The system of claim 13 further comprising means for publishing said data to a network server for access by said tools upon successful completion of processing of said work object.

* * * * *